United States Patent
Schultze

[15] 3,705,682
[45] Dec. 12, 1972

[54] APPARATUS FOR SEPARATING CRYSTALS FROM A MELT

[72] Inventor: Hans-Joachim Schultze, Chur/Grisons, Switzerland

[73] Assignee: Inventa AG, Zurich, Switzerland

[22] Filed: April 7, 1970

[21] Appl. No.: 26,195

[30] Foreign Application Priority Data

April 18, 1969 Switzerland..........................5875/69

[52] U.S. Cl. .........................233/11, 233/46, 233/17
[51] Int. Cl. ..............................................B04b 15/02
[58] Field of Search........233/1 R, 11, 46, 26, 27, 17, 233/12; 210/178, 179, 369, 382; 127/19, 56; 260/239.3 A

[56] References Cited

UNITED STATES PATENTS

| 1,634,244 | 6/1927  | Jones.....................................233/11 |
| 3,255,805 | 6/1966  | Bechard............................233/11 X |
| 3,377,020 | 4/1968  | Piper.....................................233/11 |
| 2,813,858 | 11/1957 | Joris..............................260/239.3 A |
| 3,493,114 | 2/1970  | Gosling..............................210/179 |
| 3,207,627 | 9/1965  | Dietzel et al. ..........................127/19 |
| 2,696,307 | 12/1954 | Rush................................210/179 X |
| 2,688,405 | 9/1954  | Sharples..............................210/179 |

*Primary Examiner*—Jordan Franklin
*Assistant Examiner*—George H. Krizmanich
*Attorney*—Mason, Fenwick & Lawrence

[57] ABSTRACT

Method and apparatus for purifying organic substances which form crystals and melt without decomposition by use of centrifuge which includes heating of the discharge channels above the melting point of the substance to prevent crust formation.

3 Claims, 4 Drawing Figures

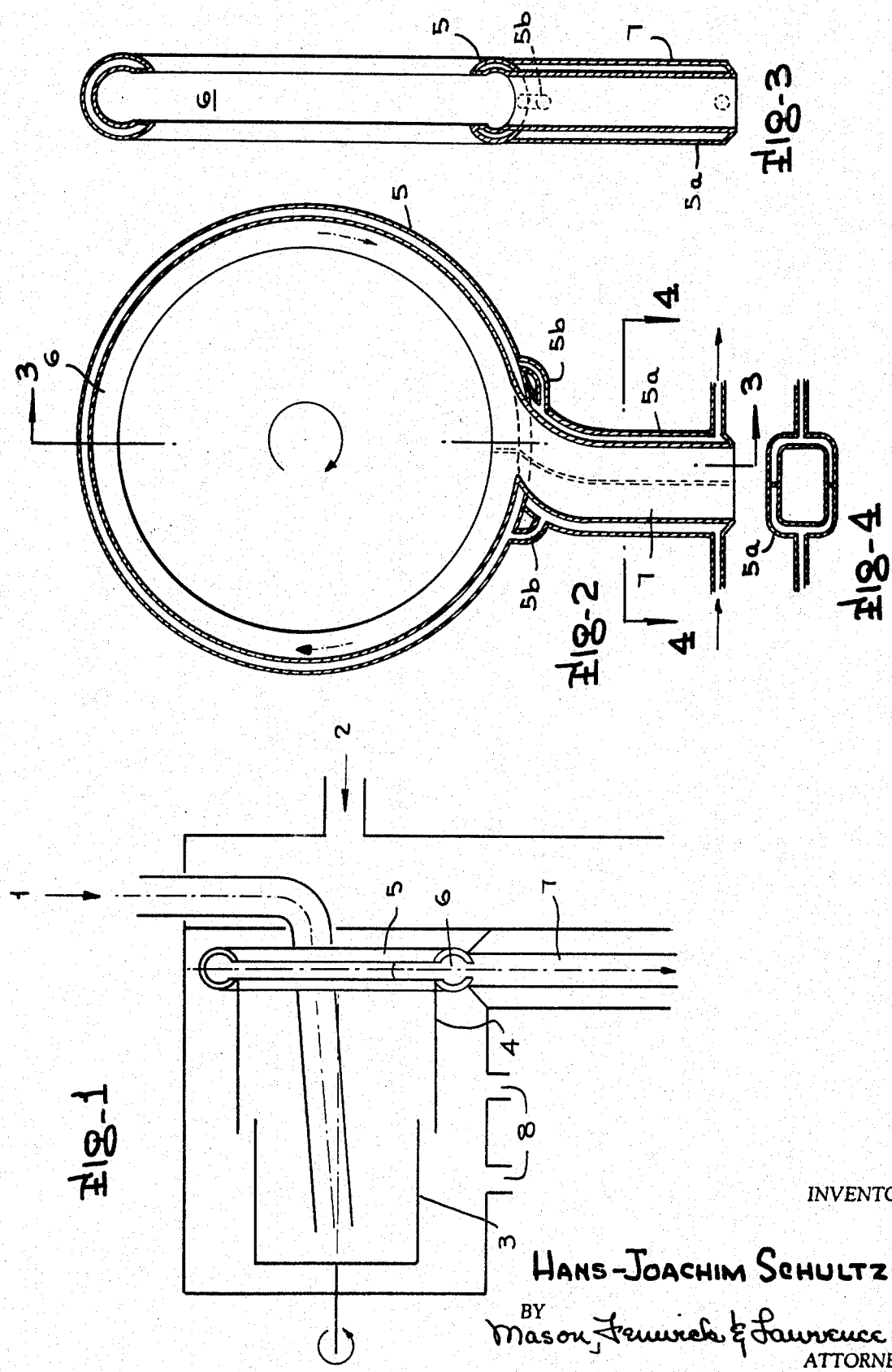

APPARATUS FOR SEPARATING CRYSTALS FROM A MELT

METHOD OF SEPARATING CRYSTALS FROM A MELT

It is known that organic substances which form crystals, melt without decomposition and do not form mixed crystals with impurities can be brought to a high purity by crystallization from the melt. An interesting purification process is represented, for example, by the variant in which there is added to a melt of such a substance which is kept under adiabatic conditions, the same organic substance in solid crystalline form and, after equilibrium of the melt has been reached, the crystal sludge is separated into crystals and melt (see in this connection, for example, Swiss Pat. No. 450,433 and Swiss Pat. No. 458,284.

In the above-mentioned processes for the purification of organic substances, the impurities originally distributed uniformly in the total substance are accumulated in the melt after the separation of crystals and residual melt. It is therefore of great importance for the purity that can be achieved for the separated crystals how carefully the separation is effected and how much of the residual melt is left on the crystals as a covering. This is to say, the purity of the crystals obtained is dependent on the effectiveness of the separating apparatus that is employed.

Usually, centrifuges are employed as separating or segregating apparatus and, with continuous crystallization, thrust or paring centrifuges operating continuously in suitable manner are used. These centrifuges must be heated or cooled, depending on the material to be crystallized and centrifuged. In spite of the growth of crystals which are as large as possible and allowing the centrifuges to run at high speed, it is impossible, in consequence of the small temperature margin available and the generally relatively high viscosity of the melt at the melting point of the substance, to avoid up to 10 percent of the crystal mass that is thrown off consisting of residual melt which has remained attached. This residual melt is still liquid at the instant when the crystals leave the centrifuge, since the crystals are at melt temperature.

The rate at which the crystals leave high-speed thrust or paring centrifuges is very high (20 – 40 m/sec.). In order to prevent the crystals flying apart in all directions, commercial centrifuges are equipped with an annular circular track or channel open towards the center of the ring and in which the crystals leaving the centrifuge proper are collected and locked out through an opening. In the course of time, in spite of the high speed, crystals are left attached within this channel and/or to the outlet opening therein. Owing to the heat that the crystals carry with them and because of the adhering residual melt, these crystals form solid crusts by sticking and sintering together and these crusts finally cause blocking of the channel and compel the centrifuge to be cleaned. Such interruptions are very disturbing to continuous operation.

This phenomenon also occurs in the centrifuging of crystals from solutions. As aqueous solutions are generally concerned (for example, solutions of sugar, salts, etc.), the cleaning can be effected in this case by flushing with water or blowing steam into the centrifuge. The aqueous solution formed flows off through the liquid outlet and can generally be combined with the mother liquor from the crystallization and be subjected to further processing. There is no need to dry the centrifuge.

This procedure is prohibited in the crystallization of melts. Water is in any case a foreign substance and the aqueous solution formed when flushing is carried out, as far as the organic substance is soluble at all in water or miscible therewith, cannot be added to the mother liquor from the crystallization, i.e., the melt. A separate outlet would be necessary for the aqueous flushing liquid and the centrifuge would moreover have to be dried before being put into operation. Both mean an uneconomic and undesirable complication of the process. The melting away of the crusts by means of a hot gas supplied to the centrifuge from outside is likewise technically difficult to achieve and timeconsuming, since the transfer of heat from the gas to a solid substance is poor. Moreover, the interior of the centrifuge would have to be cooled down to the working temperature after the melting-away process.

Surprisingly, it has now been found that the incrustation referred to and the difficulties resulting therefrom can be avoided if the circular discharge channel is so heated during the centrifuging process that its temperature is above the melting point of the crystals flung off. In this case, the crystals melt on the channel and leave it as melt. Because of the high velocity of the crystals, this was a completely unexpected discovery, since in fact the dwell time of the crystals in the channel is only fractions of a second. The heating may be effected by way of a double casing by means of a heat carrying liquid, such as, for instance, water or oil, or else with steam. For substances whose melting point is between 50° and 75° C, heating with steam at a temperature of 100° C is sufficient. It is usually sufficient if the discharge channel is kept at a temperature of 5° – 50° C, advantageously 10° – 30° C, above the melting point of the crystals in question. This temperature range cannot be defined sharply, since it may depend on various factors, such as, for example, the charging of the centrifuge, the size of the crystals and the heat of fusion. Details of the design of the heatable channel and of the outlet opening therein will be different from one case to another. The design will depend on the nature of the substance, the melt temperature and the heat of fusion, the surface tension and viscosity of the melt and the loading of the channel, i.e., the amount of substance flung out per unit of time.

Accordingly, the present invention relates to a method of separating crystals of organic substances melting without decomposition from the melt by means of centrifuges which is characterized in that the discharge channels of the centrifuges are heated to a temperature above the melting point of the crystals flung off, and to a centrifuge for carrying this method into effect.

As crystal-forming organic substances which melt without decomposing there may be mentioned, for example, benzene, cyclohexane, cyclododecane, cyclodecanone, cyclododecanone, cyclohexanone oxime, acetic acid, hexamethylenediamine, cyclohexanecarboxylic acid, w-cyanundecanoic acid, cyclododecanecarboxylic acid, adipic acid, sebacic acid, p-xylene, phenol, p-hydroxybenzoic acid methyl ester, dimethyl terephthalate and, in particular, also lactams such as, for example, caprolactam and laurinlactam.

With the aid of the method according to the invention, it is possible to extend the running time of the centrifuge used considerably, i.e., by a multiple. The frequent melting away of crusts that are formed which has heretofore been necessary becomes unnecessary. When the centrifuge is equipped with an outlet for solid material, the separate collection of the melt obtained by the melting of the crusts requires auxiliary devices which may cause trouble. With the liquid discharge according to the present invention, such special devices are dispensed with.

An advantage of the method according to the invention also consists in that substances which decompose readily at temperatures above their melting point do not suffer any detrimental change in quality in consequence of the brief time of contact with the hot channel. This ensures in any case that the purity of crystals re-liquefied in this way does not undergo any reduction compared with unliquefied discharged crystals.

EXAMPLE 1

By means of a metering pump, 70 kg per hour of a sludge consisting of about 50 percent by weight of caprolactam crystals (average grain size 0.5 mm) and 50 percent by weight of caprolactam melt are delivered at 1 to a commercial two-stage thrust centrifuge.

The centrifuge (speed 2,150 r.p.m., thrust rate 96/min.), the interior space of which is heated by air at 70° C introduced at 2 (5 m³/h) into the front of the centrifuge, is also heated externally. Depending on the purity of the product the temperature of the sludge is between 67° and 69.2° C.

The crystal sludge passes (see FIG. 1) via the first centrifugal stage 3 to the second centrifugal stage 4. The crystals, which are now largely freed from the melt, but tend to stick together, leave the second centrifugal stage and are collected in the circular or annular discharge channel 6 provided with a double casing or jacket 5 and heated with steam at a temperature of 100° C.

A similar jacket 5a is provided as shown in FIGS. 2 and 3 which is in communication with the channel jacket 5 by jacket connector 5b. Heating median enters and leaves as shown in FIG. 4.

The crystals melt in the circular track and the melt formed in this way leaves the channel through a heated outlet shaft 7. The residual melt is carried off through openings 8 provided at the lower portion of the centrifuge housing.

15 hours after being put into operation, the centrifuge still runs satisfactorily.

If the centrifuge is operated under the same conditions, but with the use of a conventional unheated circular channel, such amounts of crystal crusts settle in the latter in the course of 3 to 5 hours that it becomes necessary to break off the supply of sludge and clean the centrifuge.

EXAMPLE 2

70 kg of a sludge at a temperature of 151° C and consisting of about 30 percent weight of laurinlactam crystals and about 70 percent by weight of lactam melt are worked up per hours similarly to the method described in Example 1. The discharge channel is heated to 185° C by means of heat carrying oil.

9 hours after being put into operation, the centrifuge still runs satisfactorily. If the centrifuge is operated under the same conditions, but with the use of an unheated discharge channel, the centrifuge has to be cleaned on the average every 1 to 2 hours.

A similar result is obtained when a sludge consisting of 55 percent by weight of caprolactam crystals and 45 percent by weight of caprinlactam melt is worked up.

EXAMPLE 3

60 kg of cyclododecanone crystal sludge containing 46 percent of crystals and 54 percent of melt and at a temperature of 55.7° C are processed per hour by means of a heated centrifuge. With an unheated discharge channel, the average running time of the centrifuge is 2 hours. If, however, the discharge channel is heated with water at a temperature of 90° C or with steam, blocking of the centrifuge has still not occurred after 8 hours.

EXAMPLE 4

53 kg of a crystal sludge consisting of 21 kg of crystalline phenol and 32 kg of liquid phenol (temperature of the sludge 40.1° C) are separated per hour into crystals and melt by means of a centrifuge. If an unheated discharge channel is used, the centrifuge must be cleaned after 2 to 3 hours. If the channel is heated to 65° – 70° C with water, the centrifuge still operates satisfactorily after 10 hours.

We claim:

1. A multi-stage centrifuge adapted to purify and continuously collect crystalline organic substances from an impure sludge of said crystals dispersed in a melt of said crystal material, comprising:

means for continuously introducing said impure crystalline sludge into a first stage;

first stage means for effecting transfer of impurities from said crystals and for simultaneously centrifugally separating the purified crystals from said remaining impure sludge;

last stage means for receiving said separated purified crystals from said first stage and for centrifugally separating the remaining sludge from said purified crystals;

means for collecting and discharging said separated impure sludge from each of said stages;

crystal receiving means surrounding said last stage at its terminal end portion comprising an annular chamber having a C-shaped cross-section, the open portion of which communicates with said last stage terminal end portion, and provided with a heated inner wall for substantially instantaneously melting said crystals which are directed against said wall immediately upon leaving said last stage;

a discharge conduit communicating with said annular chamber having its inner wall surface heated;

heating means enveloping said annular receiving chamber and said discharge conduit for maintaining the temperature of said annular chamber and discharge conduit above the melting point of said purified crystals;

said purified crystals being continuously collected at the bottom of said C-shaped annular chamber and continuously discharged into and through said discharge conduit as a melt substantially free of said impurities initially present therein, said annular chamber and discharge conduit remaining open at all times permitting the unimpeded passage and collection of said purified crystal melt.

2. The multi-stage centrifuge of claim 1 further including means for heating each said centrifugal stages.

3. The multi-stage centrifuge of claim 1 wherein said heating means or said annular chamber and said discharge conduit is formed as a continuous passage.

* * * * *